United States Patent
Hsu et al.

(10) Patent No.: US 7,641,463 B2
(45) Date of Patent: Jan. 5, 2010

(54) DETECTING APPARATUS

(75) Inventors: Hsuan-Hung Hsu, Taipei Hsien (TW);
Chih-Wei Hsieh, Taipei Hsien (TW);
Shu-Chi Chang, Taipei Hsien (TW);
Yaw-Shen Lai, Taipei Hsien (TW)

(73) Assignee: Foxnum Technology Co., Ltd., Tucheng, Taipei County (TW)

( * ) Notice: Subject to any disclaimer, the term of this patent is extended or adjusted under 35 U.S.C. 154(b) by 0 days.

(21) Appl. No.: 12/178,650

(22) Filed: Jul. 24, 2008

(65) Prior Publication Data
US 2009/0243129 A1 Oct. 1, 2009

(30) Foreign Application Priority Data
Mar. 26, 2008 (CN) .................. 2008 1 0300717

(51) Int. Cl.
*B29C 45/80* (2006.01)
*B29C 45/76* (2006.01)
(52) U.S. Cl. ........................ 425/169; 425/136
(58) Field of Classification Search ............... 425/136, 425/138, 169, 151, 567, 568, 569, 570; 73/862.391, 73/862.451, 862.471, 862.392; 264/40
See application file for complete search history.

(56) References Cited

U.S. PATENT DOCUMENTS

| | | | | |
|---|---|---|---|---|
| 6,205,868 | B1* | 3/2001 | Miller | 73/862.391 |
| 7,029,257 | B2* | 4/2006 | Lee et al. | 425/116 |
| 7,242,286 | B2* | 7/2007 | Knox | 340/457.1 |
| 2004/0047942 | A1* | 3/2004 | Vasapoli et al. | 425/564 |
| 2007/0235243 | A1* | 10/2007 | Nathan et al. | 180/273 |

* cited by examiner

*Primary Examiner*—Kat Wyrozebski
*Assistant Examiner*—Vishal I Patel
(74) *Attorney, Agent, or Firm*—Zhigang Ma

(57) ABSTRACT

A detecting apparatus and method for detecting deformation of a fixed mold plate of an injection molding machine. The apparatus includes a mounting member and an elastic member that is received in the through hole of the mounting member and generally positioned at the center thereof. The apparatus also has a contacting member that is received in the through hole and positioned near or at the first end surface, and a sliding member that is slidably received in the through hole near or at the second end surface. A blocking member is attached to the second end surface of the mounting member. A pressure sensor is fixed between the blocking member and the contacting member.

9 Claims, 3 Drawing Sheets

DETECTING APPARATUS

BACKGROUND

1. Field of the Invention

The present invention relates to a detecting apparatus for detecting deformation of a fixed mold plate of an injection molding machine.

2. Description of related art

Generally speaking, an injection molding machine uses force to engage the nozzle against a sprue bushing of a fixed mold plate during use. The engagement provides a sealed connection between the nozzle and the sprue bushing preventing leakage of molten resin. A movable mold plate is clamped on the fixed mold plate during injection. Thus, the nozzle and the movable mold plate respectively resist against opposite sides of the fixed mold plate. After injection, the movable mold plate is moved away from the fixed mold plate, but the nozzle still resists against the corresponding side of the fixed mold plate, which may deform the fixed mold plate. If deformation isn't timely detected and action taken to correct it, life of the nozzle and sprue bushing may be reduced.

What is desired, therefore, is a detecting apparatus which can detect deformation of a fixed mold plate of an injection molding machine.

SUMMARY

A detecting apparatus for detecting deformation of a fixed mold plate of an injection molding machine includes a mounting member, an elastic member, a contacting member, a sliding member, a pressure sensor, and a blocking member. The mounting member has a first end surface and a second end surface opposite to the first end surface, and defines a through hole extending through the first end surface and the second end surface. The mounting member is capable of being located at one side of the fixed mold plate. The elastic member is located in the through hole of the mounting member and generally positioned at the center thereof. The contacting member is located in the through hole and positioned near or at the first end surface. The sliding member is located in the through hole near or at the second end surface, to sandwich the elastic member together with the contacting member. The blocking member is attached to the first end surface of the mounting member. The pressure sensor is fixed between the blocking member and the contacting member, and opposite ends thereof contacting the contacting member and the blocking member. A distal end opposite to the elastic member of the sliding member is capable of elastically contacting the fixed mold plate because of the elasticity of the elastic member, and moving together with the fixed mold plate when the fixed mold plate is deformed. The elastic member deforms with the movement of the sliding member causing a change in pressure applied to the pressure sensor through the contacting member.

Other advantages and novel features will become more apparent from the following detailed description when taken in conjunction with the accompanying drawings, in which:

DETAILED DESCRIPTION OF THE DRAWINGS

DETAILED DESCRIPTION

Figure 1:
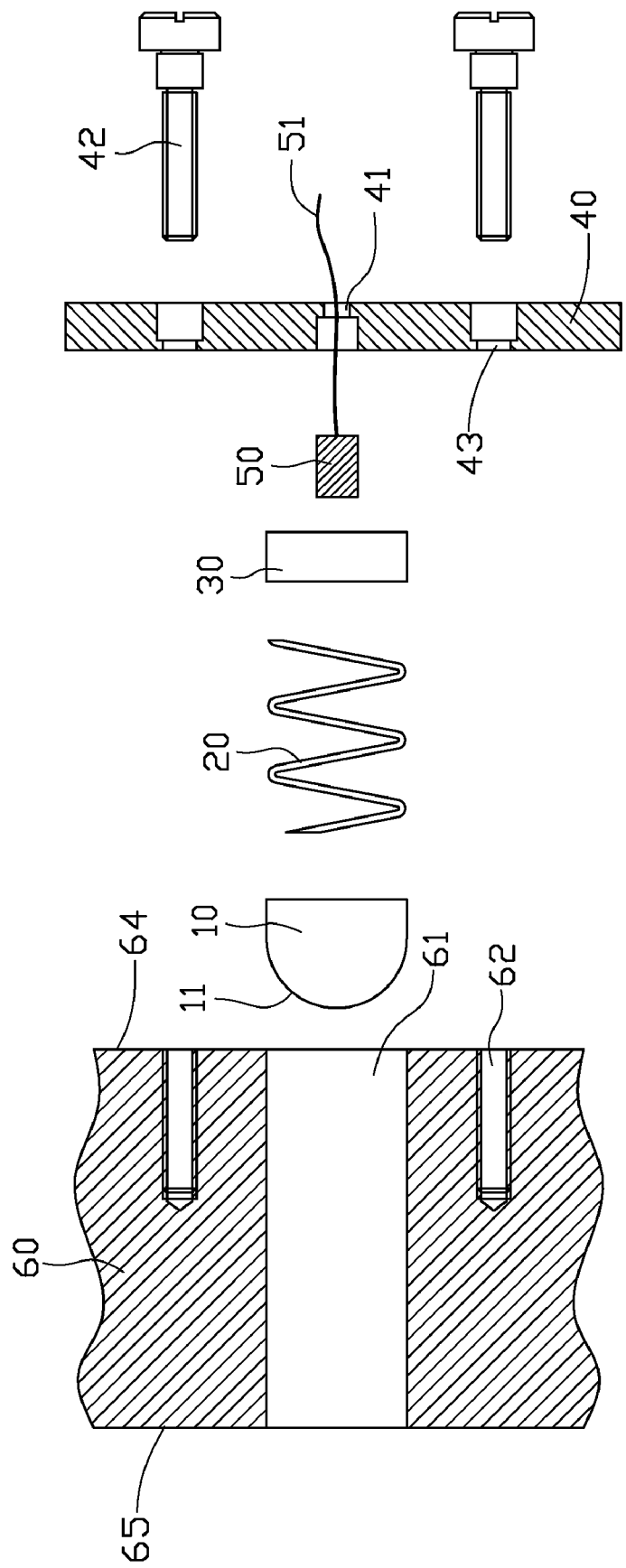
FIG. 1 is an exploded, sectional view of a detecting apparatus in accordance with an embodiment of the present invention.
Figure 2:
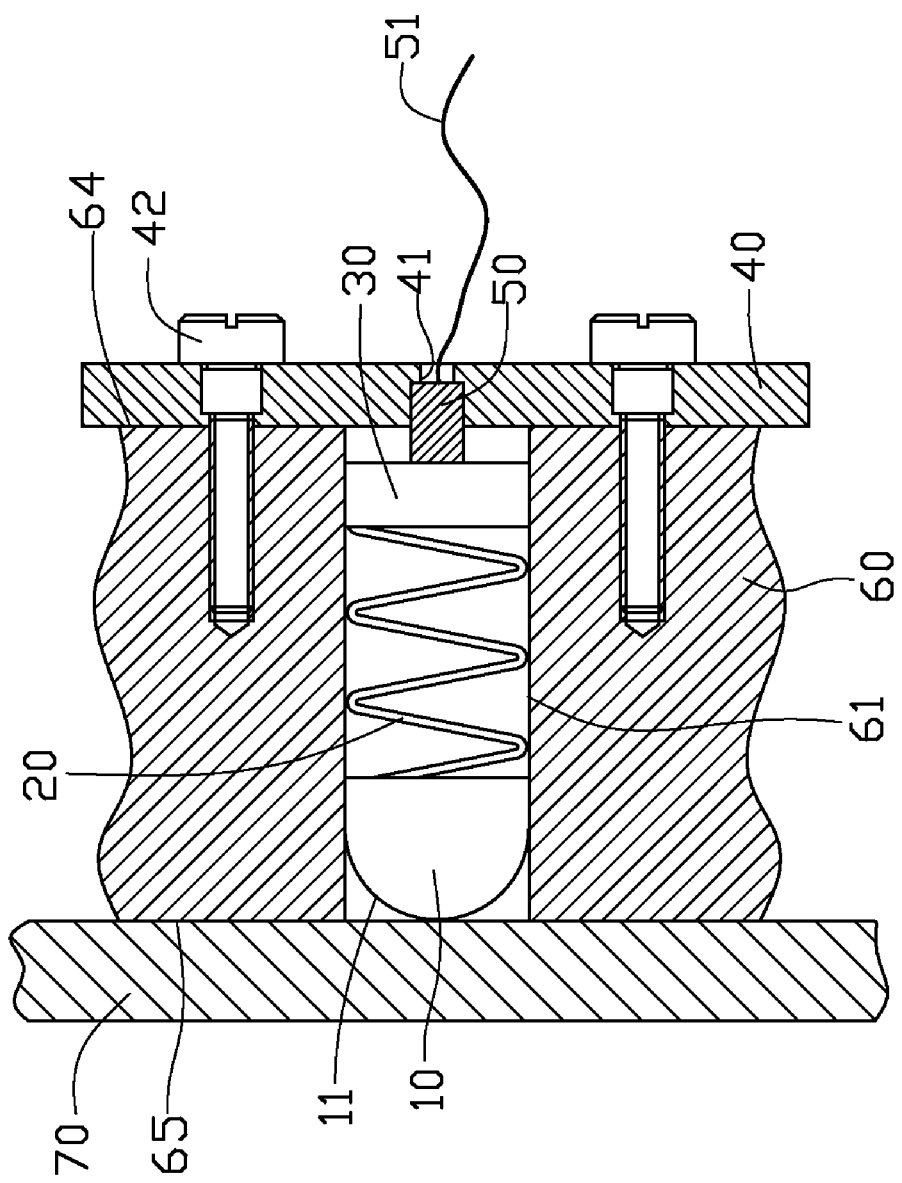
FIG. 2 is an assembled view of FIG. 1 together with a fixed mold plate of an injection molding machine.

Referring to FIG. 1 and FIG. 2, a detecting apparatus in accordance with an embodiment of the present invention is provided for detecting deformation of a fixed mold plate 70 of an injection molding machine. The detecting apparatus includes a mounting member 60, a sliding member 10, an elastic member 20, a contacting member 30, a blocking member 40, and a pressure sensor 50.

The mounting member 60 defines a through hole 61 passing through a first end surface 64 and a second end surface 65 opposite to the first end surface 64 thereof, and a plurality of screw holes 62 in the first end surface 64 thereof surrounding the through hole 61.

The sliding member 10 is column-shaped. An arc-shaped portion 11 protrudes out from an end of the sliding member 10. The elastic member 20 is a helical spring. The blocking member 40 defines a stepped hole 41 and a plurality of screw holes 43 surrounding the stepped hole 41 therein. The pressure sensor 50 includes a signal transmission wire 51.

To assemble the detecting apparatus, the elastic member 20 is slidably received in the through hole 61 of the mounting member 60 and generally positioned at the center thereof. Next, the contacting member 30 is slidably received in the through hole 61 and positioned near or at the first end surface 64. Then, the sliding member 10 is slidably received in the through hole 61 near or at the second end surface 65, to sandwich the elastic member 20 together with the contacting member 30. When the elastic member 20 is in a relaxed state the portion 11 of the sliding member 10 should at least partially extend out of the through hole 61, and the contacting member 30 should be flush with or partially extend out beyond the plane of the first end surface 64 of the mounting member 60. One end of the pressure sensor 50 is then fixed in the stepped hole 41 of the blocking member 40. A plurality of screws 42 is extended through the corresponding screw holes 43 of the blocking member 40 to screw into the screw holes 62 of the first end surface 64 of the mounting member 60, to fix the blocking member 40 to the first end surface 64 of the mounting member 60. The other end of the pressure sensor 50 contacts the contacting member 30. In assembling the detecting apparatus to the injection molding machine, the mounting member 60 of the detecting apparatus contacts the fixed mold plate 70 of the injection molding machine, causing the sliding member 10 to be pushed into the through hole 61 of the mounting member 60 against the elastic member 20. When the sliding member 10 is pushed in, deformation of the elastic member 20 causes the contacting member 30 to press against the pressure sensor 50. The pressure sensor 50 transforms the pressure applied thereto into an initial electronic signal that it sends to the injection molding machine via the signal transmission wire 51. Then, any deformation caused in the fixed mold plate 70 in the area of the fixed mold plate over the hole 61 will result either in a lessening or an increase in the pressure against the pressure sensor 50.

Figure 3:
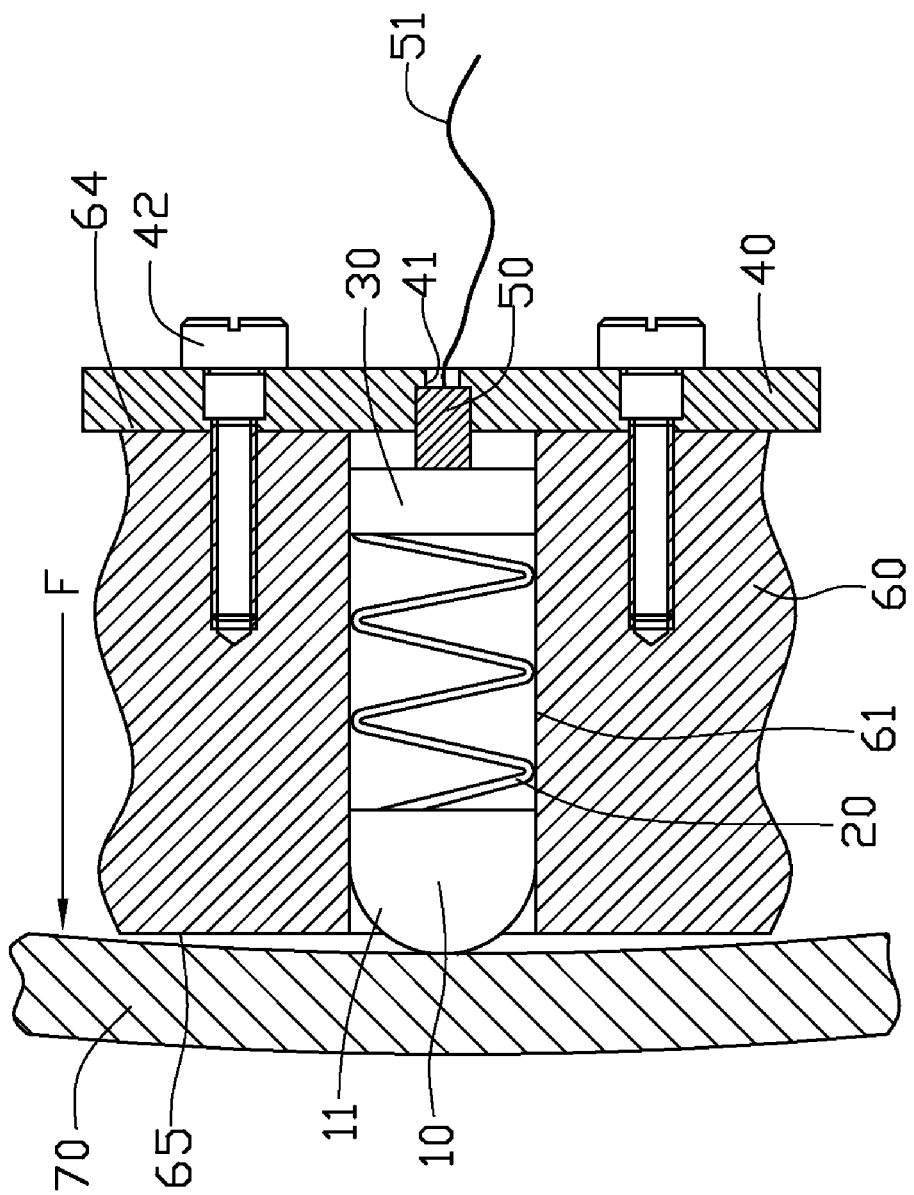
FIG. 3 is similar to FIG. 2, but showing the fixed mold plate being deformed.

Referring to FIG. 3, as one example of possible deformation of the fixed mold plate 70, after injection, the movable mold plate is moved away from the fixed mold plate 70, and a force F that was applied during the injection molding process to maintain engagement of the nozzle against the sprue bushing of the fixed mold plate 70 remains. In this instance, the fixed mold plate 70 is deformed away from the second end surface 65 of the mounting member 60. The sliding member 10 is then able to extend out of the hole 61 by restoration of the elastic member 20 to some extent, thereby causing the contacting member 30 to less intensely press against the pressure sensor 50. The change in pressure applied to the pressure sensor 50 causes a new signal to be transmitted to the injection molding machine via the signal transmission wire 51. The new signal initiates an adjustment of the force F by the injection molding machine thus preventing further deformation of the fixed mold plate 70 and even allowing resilient restoration of the fixed mold plate 70.

In this embodiment, the sliding member 10, the elastic member 20, and the contacting member 30 together form a resilient plunger mechanism that, when sandwiched between the pressure sensor 50 and the fixed mold plate 70, translate changes in shape of the fixed mold plate 70 into varying pressures applied to the pressure sensor 50.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A detecting apparatus, the detecting apparatus comprising:
   a mounting member comprising a first end surface and a second end surface that opposite to the first end surface, a through hole defined through the first end surface and the second end surface, wherein the mounting member is capable of being located at one side of a fixed mold plate;
   an elastic member received in the through hole of the mounting member;
   a contacting member received in the through hole and positioned near or at the first end surface;
   a sliding member slidably received in the through hole near or at the second end surface, wherein the elastic member is located between the contacting member and the sliding member;
   a blocking member attached to the first end surface of the mounting member; and
   a pressure sensor arranged between the blocking member and the contacting member, and engaging the contacting member;
      wherein the sliding member is biased by the elastic member, to be linear moveable in response to change of a contacted surface, the pressure sensor is capable of sensing deformation of the elastic member caused by the sliding member.

2. The detecting apparatus as claimed in claim 1, wherein an end of the sliding member opposite to the elastic member is arc-shaped.

3. The detecting apparatus as claimed in claim 1, wherein the blocking member is fixed to the first end surface of the mounting member, and the pressure sensor is fixed to the blocking member.

4. An apparatus, the apparatus comprising:
   an injection molding machine comprising a fixed mold plate;
   a mounting member defining a through hole therein, wherein the mounting member is located at one side of the fixed mold plate;
   an elastic member located in the through hole of the mounting member;
   a contacting member located in the through hole;
   a sliding member located in the through hole, wherein the elastic member is located between the contacting member and the sliding member;
   a blocking member attached to the mounting member near the contacting member; and
   a pressure sensor located between the blocking member and the contacting member, and engages the contacting member;
   wherein the mounting member and the fixed mold plate are moveable relative to one another; the sliding member is biased by the elastic member and capable of linear movement in response to the surface of the fixed mold plate, the pressure sensor is capable of sensing deformation of the elastic member caused by the sliding member.

5. The apparatus as claimed in claim 4, wherein an end of the sliding member opposite to the elastic member is arc-shaped.

6. The apparatus as claimed in claim 4, wherein the blocking member is fixed to an end surface of the mounting member, and the pressure sensor is fixed to the blocking member.

7. The apparatus as claimed in claim 4, wherein the injection molding machine further comprises a nozzle; the mounting member is located at the side of the fixed mold plate that is near the nozzle.

8. The apparatus as claimed in claim 4, wherein the contacting member is biased by the elastic member to apply a first pressure to the pressure sensor in response to when the fixed mold plate is located at a first position related to the mounting member; the contacting member applies a second pressure to the pressure sensor in response to when the fixed mold plate is deformed to a second position related to the mounting member; the pressure sensor transforms the first and second pressures to different signals.

9. The apparatus as claimed in claim 8, wherein the injection molding machine adjusts the fixed mold plate according to the signals generated by the pressure sensor.

* * * * *